Patented Sept. 19, 1944

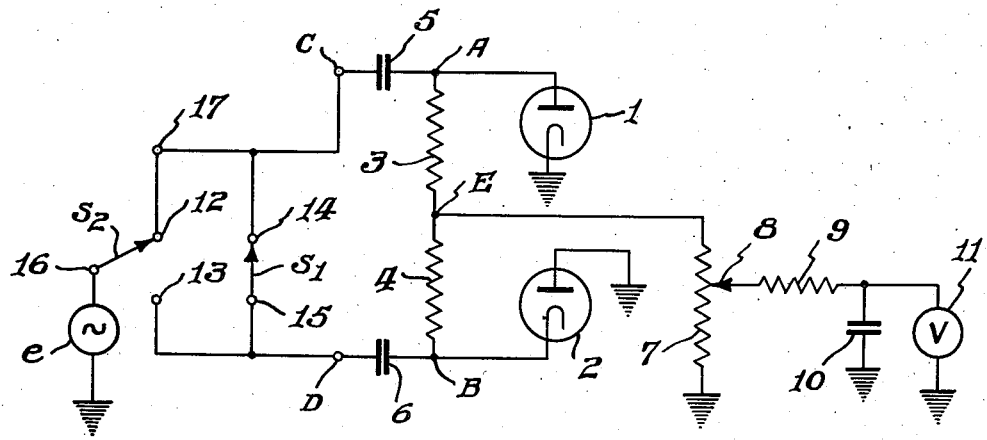

2,358,391

UNITED STATES PATENT OFFICE 2,358,391

MEASURING CIRCUIT

John R. Ford, Narberth, Pa., assignor to Radio Corporation of America, a corporation of Delaware Application October 1, 1942, Serial No. 460,388

10 Claims. (Cl. 171—95)

This invention relates generally to electrical measuring circuits and particularly to a thermionic tube measuring instrument which includes means for minimizing the effect of variations of thermal tube currents upon the zero setting of the instrument over extended ranges.

Heretofore, vacuum tube voltmeters and similar instruments have had the inherent disadvantage of instability of zero setting. This condition has been due primarily to variations in anode current due to normal cathode temperature changes. Since means for controlling cathode temperature or normal plate current are not always feasible in apparatus of this type, the instant invention contemplates the neutralization of such thermal currents as an effective means of obtaining desired stability.

The apparatus to be described is a typical thermionic tube voltmeter utilizing a diode rectifier, and including a voltage divider from which selected potentials are applied to a conventional voltmeter. In order to neutralize effectively the effect of thermal currents incident to variations in voltmeter range or cathode temperature, a second diode is utilized, and both diodes are connected to a resistive network, in a bridge circuit wherein the thermal currents derived from the two diodes oppose and substantially neutralize each other.

Among the objects of the invention are to provide a new and improved method of and means for measuring electrical quantities. Another object is to provide a new and improved method of and means for measuring electrical quantities wherein normal current variations within the measuring instrument are substantially neutralized to provide a highly accurate indication of the applied quantity. Still another object of the invention is to provide a new and improved method of and means for measuring electrical quantities which comprises a thermionic tube measuring instrument including means for compensating for normal cathode temperature changes and for thermal currents incident to variation of circuit elements as the instrument range is varied.

The invention will be described by referring to the accompanying drawing of which the single figure is a schematic circuit diagram of one embodiment thereof.

Referring to the drawing, the voltmeter circuit includes a first diode thermionic tube 1, the cathode of which is connected to ground, and a second diode thermionic tube 2, the anode of which is connected to ground. The anode of the first diode 1 is connected to one terminal A of a first resistor 3. The remaining terminal E of the first resistor 3 is connected to one terminal of a second resistor 4. The remaining terminal B of the second resistor 4 is connected to the cathode of the second diode 2. The resistors 3 and 4 should have substantially equal resistance. The electrical midpoint E of the resistor network 3, 4 is connected to one terminal of a potentiometer 7. The remaining terminal of the potentiometer 7 is connected to ground. The sliding contact 8 of the potentiometer 7 is connected, through a third resistor 9, to one terminal of a conventional voltmeter 11. The remaining terminal of the voltmeter 11 is connected to ground. If desired, a bypass capacitor 10 may be connected across the voltmeter 11 to effectively segregate the A. C. and D. C. components of the voltages derived from the potentiometer 7.

It should be understood that additional amplification may be inserted in the circuit, or that triodes or other multielement thermionic tubes may be substituted, in any known manner, for the diodes described heretofore.

A first voltmeter input terminal C is connected through a first coupling capacitor 5 to the first terminal A of the first resistor 3. A second voltmeter input terminal D is connected through a second coupling capacitor 6 to the second terminal B of the second resistor 4. The first input terminal C is also connected to one stationary contact 12 of a single pole-double throw switch S2 and to the stationary contact 14 of a single pole-single throw switch S1. The second voltmeter input terminal D is connected to a second stationary contact 13 of the single pole-double throw switch S2 and to the movable contact 15 of the single pole-single throw switch S1. A source of voltage e, to be measured, is connected between the movable contact 16 of the single pole-double throw switch S2 and ground.

Preferably, the first and second diodes 1 and 2 should be of similar construction and electrical characteristics. Normal thermal-current in the first diode 1 will make the first terminal A of the first resistor 3 negative with respect to ground. Normal thermal-currents in the second diode 2 will make the second terminal B of the second resistor 4 positive with respect to ground. Since the resistance of the first resistor 3 is substantially equal to the resistance of the second resistor 4, and the characteristics of the first diode 1 are similar to the characteristics of the second diode 2 thermal-currents (due to initial electron velocity of cathode emission) of the two diodes will be equal in magnitude and effectively neutralize each other. Consequently, the electrical midpoint E of the resistor network 3, 4 will be free of voltage variations due to variations in the diode characteristics. Likewise, since the electrical midpoint E of the resistor network is effectively at ground potential, insofar as thermal-currents are concerned, adjustment of the sliding contact 8 of the potentiometer 7 will not cause any change in the zero setting of the indicator 11. In practice, perfect neutralization of thermal-currents is not attainable, since the electrical characteristics of the diodes 1 and 2 cannot be made identical. However, the invention permits the reduction of the effects of thermal-current variations to a satisfactory value.

In operation, if the movable and stationary contacts 15 and 14, respectively, of the single pole-single throw switch S1 are not in contact, and the movable contact 16 of the single pole-double throw switch S2 is connected to the fixed contact 13, the second diode 2 will operate as a rectifier providing a low impedance path for the negative peaks and an effective open circuit for the positive peaks of the A. C. potentials applied thereto through the coupling capacitor 6. The positive voltage half cycles resulting at the point B, from the flow of current through the capacitor 6 during the time the negative half cycles are applied, will provide currents through the resistor 4 which will divide—first, through the resistor 3 and the first diode 1 to ground, and secondly, through the indicating circuit including the voltage divider 7 to ground returning through the signal source e to the other side of the capacitor 6. Hence, indications proportional to the magnitude of the positive half cycles derived from the voltage source e will be obtained on the indicator 11. When the movable contact 16 of the switch S2 is connected to the fixed contact 12, the first diode 1 will operate as a rectifier providing a low impedance path for the positive peaks and an effective open circuit for the negative peaks of the A. C. potentials applied thereto through the coupling capacitor 5. The negative voltage half cycles resulting at the point A, from the flow of current through the capacitor 5 during the time the positive half cycles are applied, will provide currents through the resistor 3 which will divide at the point E, and flow—first, through the resistor 4 and the second diode 2 to ground; and secondly, through the indicating circuit including the voltage divider 7 to ground, returning through the signal source e to the other side of the capacitor 5. Thus, indications proportional to the magnitudes of the negative half cycles derived from the A. C. voltage source e will be provided on the indicator 11.

When the single pole-single throw switch S1 is closed, both diodes will operate as rectifiers, such that point A will accumulate a negative voltage proportional to the positive peaks while point B will accumulate a positive voltage proportional to the negative peaks. The voltage at the electrical midpoint E will be equal to the difference of the accumulated voltages at points A and B and so will be proportional to the difference between the magnitudes of the positive and negative voltage peaks derived from the A. C. source e. The voltage at the point E is applied to the indicator circuit including the voltage divider 7, and the indicator 11 will indicate the difference between the positive and negative peak values of the voltage source e. This indication will be unaffected by the contact position of the movable element 16 of the single pole-double-throw switch S2.

Thus the invention described comprises a simple and efficient means for neutralizing to a substantial degree variations in the zero setting of a vacuum tube measuring instrument, as well as convenient means for measuring either, or both, positive and negative peaks of an applied potential.

I claim as my invention:

1. A thermionic bridge measuring circuit for a potential source including first and second series connected resistors, a first thermionic tube, a second thermionic tube, means connecting the cathode of said first tube to the anode of said second tube, means connecting the anode of said first tube to the remaining terminal of said first resistor, means connecting the cathode of said second tube to the remaining terminal of said second resistor, means for applying said potential across at least one of said series resistors, a measuring instrument, and means connecting said instrument between the common terminal of said resistors and the common electrodes of said tubes.

2. A thermionic bridge measuring circuit for a potential source including first and second series connected resistors, a first thermionic tube, a second thermionic tube, means connecting the cathode of said first tube to the anode of said second tube, means connecting the anode of said first tube to the remaining terminal of said first resistor, means connecting the cathode of said second tube to the remaining terminals of said second resistor, means for applying said potential to the bridge formed by said resistors and tubes, a measuring instrument, and means connecting said instrument between the common terminal of said resistors and the common electrodes of said tubes.

3. A thermionic bridge measuring circuit for a potential source including first and second series connected resistors, a first thermionic tube, a second thermionic tube, means connecting the cathode of said first tube to the anode of said second tube, means connecting the anode of said first tube to the remaining terminal of said first resistor, means connecting the cathode of said second tube to the remaining terminal of said second resistor, means for applying said potential to one of said series resistors, a measuring instrument, and means connecting said instrument between the common terminal of said resistors and the common electrodes of said tubes.

4. A thermionic measuring circuit for a potential source including a first diode, a second diode, means connecting the cathode of said first diode to a point of reference potential, means connecting the anode of said second diode to said point, resistive means, means connecting said resistive means to the remaining anode and cathode electrodes of said respective diodes, means connecting said potential source to said point of reference potential and to one of said remaining diode electrodes, a measuring instrument, and means connecting said instrument to said reference potential point and to said resistive means.

5. A thermionic measuring circuit for a potential source including a first diode, a second diode, means connecting the cathode of said first diode to a point of reference potential, means connecting the anode of said second diode to said point, resistive means, means connecting said resistive means to the remaining anode and cathode electrodes of said respective diodes, means connecting said potential source between said remaining diode electrodes, a measuring instrument, and means connecting said instrument to said reference potential point and to said resistive means.

6. A thermionic measuring circuit for a potential source including a first diode, a second diode, means connecting the cathode of said first diode to a point of reference potential, means connecting the anode of said second diode to said point, resistive means, means connecting said resistive means to the remaining anode and cathode electrodes of said respective diodes, reactive means connecting said potential source to said point of reference potential and to one of said remaining diode electrodes, a measuring instrument, and means connecting said instrument to said reference potential point and to said resistive means.

7. A thermionic measuring circuit for a potential source including a first diode, a second diode, means connecting the cathode of said first diode to a point of reference potential, means connecting the anode of said second diode to said point, resistive means, means connecting said resistive means to the remaining anode and cathode electrodes of said respective diodes, reactive means connecting said potential source between said remaining diode electrodes, a measuring instrument, and means connecting said instrument to said reference potential point and to said resistive means.

8. A thermionic measuring circuit for a potential source including a first diode, a second diode, means connecting the cathode of said first diode to a point of reference potential, means connecting the anode of said second diode to said point, resistive means, means connecting said resistive means to the remaining anode and cathode electrodes of said respective diodes, reactive means connecting said potential source to said point of reference potential and to one of said remaining diode electrodes, a measuring instrument, and means including a voltage divider connecting said instrument to said reference potential point and to said resistive means.

9. A thermionic measuring circuit for a potential source including a first diode, a second diode, means connecting the cathode of said first diode to a point of reference potential, means connecting the anode of said second diode to said point, resistive means, means connecting said resistive means to the remaining anode and cathode electrodes of said respective diodes, reactive means connecting said source between said remaining diode electrodes, a measuring instrument, and means including a voltage divider connecting said instrument to said point of reference potential and to said resistive means.

10. A thermionic measuring circuit for a source of potential including a first thermionic tube, a second thermionic tube, means connecting said tubes substantially to effect neutralization of thermal current variations in said tubes, a measuring instrument, means for selecting the polarity of said potential, means for applying said selected potential to said circuit, and means including said instrument connected to said neutralization means to indicate said potential.

JOHN R. FORD